United States Patent
Simpson

(10) Patent No.: US 7,346,658 B2
(45) Date of Patent: Mar. 18, 2008

(54) SYSTEM AND METHOD FOR NOTIFYING AN OFFLINE GLOBAL COMPUTER NETWORK USER OF AN ONLINE INTERACTION

(75) Inventor: Anita Hogans Simpson, Decatur, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 805 days.

(21) Appl. No.: 09/923,320

(22) Filed: Aug. 8, 2001

(65) Prior Publication Data

US 2005/0004984 A1  Jan. 6, 2005

(51) Int. Cl.
G06F 15/16 (2006.01)

(52) U.S. Cl. .......... 709/205; 705/37; 463/25; 463/40; 379/13; 379/19

(58) Field of Classification Search .......... 709/205, 709/224, 318, 206, 207, 203, 204, 227, 239, 709/219, 223; 370/349; 379/93.24; 725/109; 705/26, 37; 715/758; 455/518; 463/25, 463/40

See application file for complete search history.

(56) References Cited

U.S. PATENT DOCUMENTS

| | | | | |
|---|---|---|---|---|
| 5,793,365 A * | 8/1998 | Tang et al. | .......... | 715/758 |
| 6,021,433 A * | 2/2000 | Payne et al. | .......... | 709/219 |
| 6,148,328 A * | 11/2000 | Cuomo et al. | .......... | 709/204 |
| 6,301,609 B1 * | 10/2001 | Aravamudan et al. | .......... | 709/207 |
| 6,400,811 B1 * | 6/2002 | Yariv | .......... | 379/93.24 |
| 6,512,930 B2 * | 1/2003 | Sandegren | .......... | 455/518 |
| 6,564,261 B1 * | 5/2003 | Gudjonsson et al. | .......... | 709/227 |
| 6,575,831 B1 * | 6/2003 | Gonen et al. | .......... | 463/25 |
| 6,606,744 B1 * | 8/2003 | Mikurak | .......... | 717/174 |
| 6,615,166 B1 * | 9/2003 | Guheen et al. | .......... | 703/27 |
| 6,691,162 B1 * | 2/2004 | Wick | .......... | 709/224 |
| 6,728,754 B1 * | 4/2004 | Lipton | .......... | 709/203 |
| 6,763,384 B1 * | 7/2004 | Gupta et al. | .......... | 709/224 |
| 6,816,913 B1 * | 11/2004 | Liebenow | .......... | 709/239 |
| 6,853,634 B1 * | 2/2005 | Davies et al. | .......... | 370/349 |
| 6,879,994 B1 * | 4/2005 | Matsliach et al. | .......... | 709/204 |
| 6,908,389 B1 * | 6/2005 | Puskala | .......... | 463/40 |
| 6,912,564 B1 * | 6/2005 | Appelman et al. | .......... | 709/204 |

(Continued)

OTHER PUBLICATIONS

"Attention! CC" (www.attentionsoftware.com), no date.

(Continued)

*Primary Examiner*—Dustin Nguyen
(74) *Attorney, Agent, or Firm*—Scott P. Zimmerman, PLLC; Geoff Sutcliffe; Jodi Hartman

(57) ABSTRACT

A system and method for notifying an offline global computer network user of an online interaction in which the offline user could participate. The system and method specify notification criteria of the offline user, monitor activities occurring on the global computer network, compare the activities to the notification criteria, and, if the activities satisfy the notification criteria, forward an offline communication to the offline user, which notifies the offline user of the online interaction. Examples of the online interactions include chat rooms, game sites, instant messaging services, auctions, and calls made over the global computer network. Examples of the offline communication include calls to a wireline telephone, calls to a wireless telephone, messages to a caller identification device, messages to a wireless access protocol device, messages to a one-way pager, and messages to an interactive pager.

38 Claims, 6 Drawing Sheets

U.S. PATENT DOCUMENTS

| | | | | |
|---|---|---|---|---|
| 6,963,850 | B1* | 11/2005 | Bezos et al. | 705/26 |
| 2001/0032170 | A1* | 10/2001 | Sheth | 705/37 |
| 2001/0051989 | A1* | 12/2001 | Moncreiff | 709/206 |
| 2001/0056396 | A1* | 12/2001 | Goino | 705/37 |
| 2002/0001307 | A1* | 1/2002 | Nguyen et al. | 370/386 |
| 2002/0013761 | A1* | 1/2002 | Bundy et al. | 705/37 |
| 2002/0028708 | A1* | 3/2002 | Busch et al. | 463/42 |
| 2002/0032631 | A1* | 3/2002 | Rose | 705/37 |
| 2002/0046299 | A1* | 4/2002 | Lefeber et al. | 709/318 |
| 2002/0065761 | A1* | 5/2002 | Fischer et al. | 705/37 |
| 2002/0111813 | A1* | 8/2002 | Capps | 705/1 |
| 2002/0124100 | A1* | 9/2002 | Adams | 709/232 |
| 2004/0019912 | A1* | 1/2004 | Staack | 725/109 |
| 2004/0073507 | A1* | 4/2004 | Scott et al. | 705/37 |

OTHER PUBLICATIONS

"Microsoft.net My Services" (www.microsoft.com/MYSERVICES/alerts), no date.

"What's next for Instant Messaging" by Michael Learmonth (www.cnn.com), no date.

"Instant Messages" by Tom Weber (www.averick.com), no date.

A brief description of Email Notify (www.cyrosoft.com/cyrosoft/products/emailnotify-d.shtml), no date.

"How it Works: Instant Messaging" by Michael Gowan (www.cnn.com), no date.

"Understanding Internet Mail" by Richard Rocaberte, Jan. 1999.

"Customer Service" (www1.jcpenny.com), no date.

"About Notify Technology" (www.notifycorp.com), no date.

"Stay Connected: Never miss a Call" (www.ureach.com/home/benefits.htm), no date.

"Message Notification" (www.ureach.com/templates/help/msgnotify.htm), no date.

"Reminders" (www.ureach.com/templates/help/callhlp.htm), no date.

Description of AOL Instant Messanger 4.3 (aim.aol.com), no date.

"How Email Works" by Marshall Brain (www.howstuffworks.com/email.htm), no date.

"How Instant Messaging Works" by Jeff Tyson (howstuffworks.lycos.com/instant-messaging.htm), no date.

"Instant Messaging" (whatis.techtarget.com), no date.

"Intenet Relay Chat" (whatis.techtarget.com), no date.

"ICQ" (whatis.techtarget.com), no date.

"Chat Room" (whatis.techtarget.com), no date.

"E-Mail and the Transformation of Business" by John W. Hammon, Entelagent Software, Inc, no date.

Simpson, Anita, "Mailbug Service (MBS) At a Glance", BellSouth, Nov. 2, 2000.

"Mailburg User Guide and First Steps", p. 1-30, no date.

* cited by examiner

SYSTEM AND METHOD FOR NOTIFYING AN OFFLINE GLOBAL COMPUTER NETWORK USER OF AN ONLINE INTERACTION

BACKGROUND

1. Field of the Invention

The present invention relates generally to global computer networks and, in particular, to a system and method for notifying a user, who is not logged onto a global computer network, of interactions occurring on the global computer network in which the user could participate.

2. Background of the Invention

Individuals and businesses depend on the Internet for communication. Of the various forms of Internet communication, electronic mail ("e-mail") is undoubtedly the most prevalent form today. Every day, Internet users send each other billions of emails. In fact, industry analysts predict that, by 2005, the average daily volume of emails sent around the world will reach 35 billion.

In a traditional e-mail system, when a user sends an e-mail message to a recipient, the e-mail message is routed to the e-mail server of the recipient. The e-mail server maintains a file for the recipient and appends the e-mail message to this file. The recipient can then check his e-mail by accessing this file. If the recipient is online when the user sends the message and has e-mail software that provides notification of incoming e-mail messages, then the recipient can access the file and retrieve the e-mail message soon after the message is delivered. However, often the recipient is not online, does not have incoming e-mail notification, or elects not to open the e-mail message right away. In these cases, the e-mail message remains in the recipient's file indefinitely.

The conventional e-mail systems therefore lack an immediate access to the recipient. In contrast to telephone communications, in which a caller knows immediately whether or not he has contacted the called party, a sender of e-mail does not know if the recipient has read the e-mail until he receives some type of affirmative response. Thus, for Internet users desiring instantaneous, confirmed communication with other users, e-mail presents obvious disadvantages.

Unified messaging services partially address this lack of immediate access. These services can monitor a user's e-mail account and notify the user when an e-mail message is received. The notification can be through one-way pagers, two-way interactive pagers, facsimile transmissions, or automated telephone calls to wireline or wireless telephones. UREACH.COM™ is one example of this type of messaging service. Notably, of particular relevance to the present invention, these unified messaging services only provide a user with notification of a received e-mail message, and do not establish an online real-time interaction between the e-mail recipient and the sender of the e-mail message.

Recognizing e-mail's drawbacks with respect to immediate contact, service providers have developed other communication tools that support instantaneous online communications, more akin to telephone conversations. Chat rooms, game sites, and instant messaging services are three examples of this type of communication tool, each of which is discussed individually below. Each of these tools connects online users with other online users to support real-time communication.

A chat room is a site on a global computer network (e.g., a web site on the Internet), a part of a site, or a part of an online service that enables a group of users to send messages that are seen instantaneously by everyone in the chat room. A chat room is generally organized for a community of users sharing a common interest or association. As examples, popular chat rooms of AMERICA ONLINE™ include Health Chat, International Chat, Hockey Chat, and Computing Chat.

To participate in a chat room, a user first registers with the site operating the chat room by providing both a user name and password. The user then logs into the chat room. Once inside, the site displays to the user a list of people who are currently logged into the chat room. The list identifies each person by his or her user name. The site also alerts the users already in the chat room when a new person has entered. To enter the discussion, users type a message into a text box. The site then immediately displays the message in a larger communal message area for viewing by the other participants.

In these conventional chat rooms, users must log in and enter a room to determine who is participating at any given time. Outside of checking individual rooms, a user has no way of determining when other users are logged into a chat room. Thus, if a user is only interested in entering chat rooms having a large number of participants (who are presumably generating a lively discussion), the user must still take the trouble to enter each site to view the participant list. In addition, if a user is interested in chatting with particular users, the user must enter random chat rooms looking for those users, without any clue as to which room the particular users are in or whether the particular users are online at all. In this respect, a user would prefer to receive information concerning chat room activity before having to log in and check the participant list.

Like chat rooms, game sites require that users be online and logged in before making any connection between two players. Thus, if a first player enjoys the competition of another particular player, the first player must wait online until he sees the other particular player log in. Or, alternatively, the players must coordinate with each other to meet online at a certain time. This coordination can itself involve several messages back and forth, and a sometimes-tedious exercise of working out a mutually acceptable time. Instead of this protracted coordination, the first player would prefer to contact the other player while the first player is online and receive an immediate indication as to whether the other player is available to log on and play a game.

As another form of instantaneous online communication, instant messaging is essentially a chat room for two people. This service enables a user to easily determine whether another particular user, such as a friend or co-worker, is connected to the Internet, and, if that other particular user is connected, to exchange messages with him in real-time. Unlike e-mail, instant messaging provides online real-time discussion because both users are online and receive the instant messages automatically (e.g., in a pop-up window) without having to retrieve them.

To use instant messaging, both users must be online at the same time and have their instant messaging software set to accept messages from each other. If a user attempts to send a message to another user who is not online or who is not accepting instant messaging, the instant messaging service returns a notification to the sender indicating that the message transmission cannot be completed. If both users are online and are accepting messages, then the users remain constantly connected to their instant messaging service. Through this constant connection, users receive the messages as quickly as the data can travel through the network, thereby avoiding the less immediate storage and downloading of data that is associated with e-mail communication.

In the operation of an instant messaging service, when a user logs on to the service, the instant messaging software on the user's computer reports to the instant messaging server that the user is available to receive messages. The server then downloads to the user's computer a list of users who are currently online and logged into the instant messaging service. This list, referred to herein as a "buddy list," associates a group of users (i.e., buddies) who have agreed to accept instant messages from each other. A user creates the buddy list upon registration with the instant messaging service and can edit it at any time thereafter.

The buddy list indicates which users in the buddy group are online, typically by listing the user names of those users in an online section of the display. The names of the remaining users are listed in an offline section. The instant messaging service moves the names back and forth as the users log on and off. Thus, a user who is online can continually view the online status of his associated buddies.

Much like chat rooms, instant messaging services require that users be online and logged into the instant messaging service at the same time. If a user wants to correspond with a buddy who is not online, the user must wait and monitor the buddy list until he sees that the buddy has logged on. The user could contact the buddy by some other means, such as e-mail. This approach, however, interrupts the user's online session and burdens the user with having to launch a separate e-mail application, and compose and send a message. Moreover, if the buddy is not logged into the instant messaging service, then the buddy is probably not online, making the sending of an e-mail message pointless.

The user may also try to reach the buddy by telephone. However, the user may be accessing the Internet through his only telephone line, requiring the user to terminate his Internet session just to place a telephone call to his buddy. In any case, the user must expend additional time and possibly money (e.g., long distance telephone charges) trying to reach the buddy by telephone.

The shortcomings of instant messaging are further apparent when considering a user who is the first to log on out of all the users listed on his buddy list. After logging on, this first user has no one with whom to exchange messages and no easy way to alert his buddies that he is online and wanting to correspond.

Similarly, if nearly all users of a buddy list are online and are carrying on multiple two-way discussions with each other, the remaining users who are offline have no way to know that they are missing the opportunity to correspond with everyone. Instant messaging services do not provide notification to offline users to bring those users into the online interaction.

SUMMARY OF THE INVENTION

The present invention is a system and method for notifying an offline global computer network user of online interactions in which the offline user could participate. The notification that the present invention provides gives the offline user the opportunity to go online and join in an interaction that the offline user would have otherwise missed. An offline user can specify particular online interactions for which the user would like to receive notification. Alternatively, online users can initiate the notification to invite an offline user to join the online interaction.

According to a representative embodiment, the present invention notifies an offline user of an online interaction by specifying notification criteria of the offline user, monitoring activities occurring on a global computer network, comparing the activities to the notification criteria, and, if the activities satisfy the notification criteria, forwarding an offline communication to the offline user. The offline communication notifies the offline user of the online interaction in which the offline user could participate. Examples of the online interactions include chat rooms, game sites, instant messaging services, auctions, and calls made over the global computer network. Examples of the offline communication include calls to a wireline telephone, calls to a wireless telephone, messages to a caller identification device, messages to a wireless access protocol device, messages to a one-way pager (i.e., a pager that receives but does not transmit), and messages to an interactive pager. The offline communication can relate the notification criteria, the fact that the notification criteria have been satisfied, and the time and date that the notification criteria were satisfied.

In a further embodiment of the present invention, the offline user responds to the notification of the online interaction by indicating whether the offline user will join the online interaction. The offline user's response is then reported to a user who is already online.

In the context of chat rooms, the present invention notifies an offline user when activities in the chat room meet conditions set by the offline user. For instance, the offline user may desire notification when a particular chat room generates a certain amount of activity, as measured, for example, by the number of users logged into the chat room. As another example, the offline user may want to know when a particular user (or group of users) logs into a particular chat room. As still another example, the offline user may wish to be apprised of general chat site events, such as a special topic or forum being discussed, or a celebrity participating in a chat room discussion at a particular time. With notifications based on these types of conditions, the offline user no longer has to enter individual chat rooms and view the participant list to determine the number of participants and their names.

In an alternative chat room implementation, the present invention enables an online user to initiate notification of an offline user. The present invention also enables the offline user to respond to the notification, indicating whether the offline user will join the online interaction. The present invention reports the offline user's response to the online user.

Similarly, for game sites, the present invention notifies an offline player when certain conditions are met, such as when activity in a game reaches a certain level, when a high score has been achieved by another player, or when another player against whom the offline player would like to compete enters the game site. This convenient notification therefore avoids the difficulties in arranging mutually acceptable playing times and more readily places players in contact with each other.

In the context of an instant messaging service, the present invention notifies one or more buddies on a buddy list whenever one buddy logs on. After receiving this notification, an offline buddy can log on knowing that he will have someone with whom to exchange messages. In addition, the user who is already online does not have to interrupt his online session to attempt to contact other buddies by other communication means.

In an embodiment of the instant messaging service implementation, the offline buddy responds to the notification by indicating whether the offline user will log onto the instant messaging service. This response is reported to the online buddy so that the online buddy knows whether his buddies will be exchanging messages with him.

In the context of auction sites, the present invention notifies an offline user when activities on the auction site meet conditions set by the offline user. For instance, the offline user may want notification when a bid is entered that exceeds a high bid of the offline user, or when interest in an auction reaches a certain level, as measured, for example, by the number of bids entered within a certain duration. As another example, the offline user may want notification when a particular item goes up for bid. As still another example, the offline user may wish to know when a particular bid closes, including who won the bid and the amount paid for the bid item. With these types of conditions set, the offline user is freed from having to monitor the auction site, and can instead be notified when particular events occur. This notification method promotes a more efficient and lively bidding process.

In an embodiment of the auction site implementation, the present invention receives a response from the offline user indicating whether the offline user will participate in the auction. For example, in response to a notification of being outbid, the offline user could submit a new higher bid to immediately carry on the auction process.

The present invention also applies to calls made from one personal computer (PC) to another over a global computer network, such as Voice-over-Internet-Protocol (VoIP) PC-to-PC calls. In this context, the present invention notifies an offline user when the offline user receives an unanswered call to the offline user's personal computer. This function is especially beneficial for users that have computers that are always online (e.g., computers connected by a Digital Subscriber Line). Although the computer is always online, the user may be away from it and wish to receive notification when someone is attempting to call the user through the global computer network. Having received the notification, the user can return to the computer to take the call.

In an embodiment of this online call implementation, the present invention receives a response from the offline user indicating whether the offline user will accept the online call. The present invention reports this response to the caller so that the caller knows whether to wait online until the offline user logs on and accepts the call.

As used herein, the terms "online" and "offline" refer to whether a user is logged onto a global computer network through the user's personal computer and is available to participate in the online interaction. If a user is online, then the user can receive communications as part of the online interaction. For example, if a user is logged onto the Internet and into an instant messaging service, the user is online, meaning that the user is available to receive instant messaging communications. If a user is offline, then the user cannot receive communications as part of the online interaction. For example, if the online interaction is instant messaging, then an offline user is either logged onto the Internet but not the instant messaging service, or is not logged onto the Internet at all. As another example, if the online interaction is a PC-to-PC call over the Internet, and a user is logged onto the Internet but is not in front of his computer, then the user is considered offline.

Corresponding to these definitions, an offline communication, as used herein, refers to a communication by a means other than through the computer that the offline user would use to log onto the global computer network that is supporting the online interaction. Examples of these other means include telephone calls, off-hook and on-hook signaling to caller identification devices, messages to one-way pagers, and text messages to wireless access protocol devices and interactive pagers.

An object of the present invention is to expand participation in online real-time interactions.

Another object of the present invention is to facilitate communication between an online user and an offline user of a global computer network.

Another object of the present invention is to notify an offline user of real-time interactions in which the offline user could participate.

These and other objects, aspects, and advantages of the present invention are described in greater detail in the detailed description of the invention and the attached materials. Additional features and advantages of the invention will be set forth in the description that follows, will be apparent from the invention, or may be learned by practicing the invention.

DETAILED DESCRIPTION OF THE INVENTION

The present invention is a system and method for notifying an offline global computer network user of online interactions in which the offline user could participate. The online interactions are real-time communications in which the user is interested, including, for example, chat rooms, game sites, instant messaging, auction sites, and calls made over a global computer network (such as VoIP PC-to-PC calls).

Figure 1:
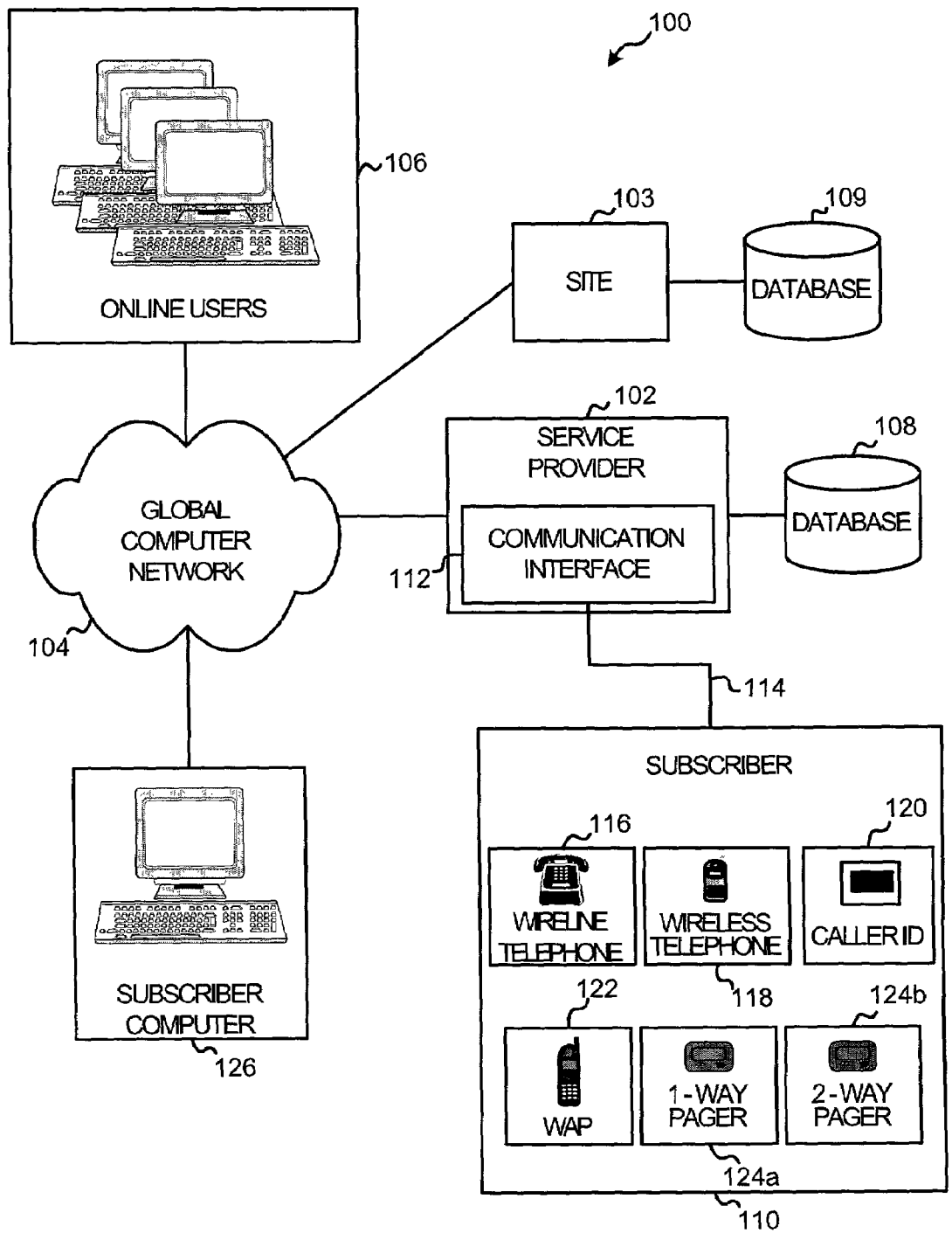
FIG. 1 is a schematic diagram of a system for notifying an offline global computer network user of online interactions, according to an embodiment of the present invention.

FIG. 1 illustrates a system 100 for notifying an offline global computer network user of online interactions, according to an embodiment of the present invention. As shown, system 100 includes a service provider 102, a global computer network 104, users 106, database 108, and subscriber 110.

Service provider 102 provides the notification service of the present invention, which involves monitoring activities of users 106 and sending communications to subscriber 110 to report certain activities. Service provider 102 is in communication with users 106 through global computer network 104, which could be the Internet, for example.

Service provider 102 is also in communication with database 108, which includes notification criteria and contact information for each subscriber to the service. The notification criteria define which activities service provider 102 is to report to subscriber 110. The contact information defines how to communicate with subscriber 110 (e.g., the type of device, such as a wireline telephone, pager, or interactive pager, and the telephone number or address of the device). Although shown as a separate component, database 108 could be a part of service provider 102. In addition, although for clarity the notification criteria is shown and described herein in the context of a single subscriber (subscriber 110), one of ordinary skill in the art would appreciate that database 108 could contain notification criteria for multiple subscribers, and that the occurrence of a single activity could result in the notification of several subscribers. For example, several friends of particular user may wish to know when that user logs into a particular chat room.

In an alternate embodiment, instead of both monitoring the activities of users 106 and reporting certain activities to subscriber 110, service provider 102 relies on another site 103 of global computer network 104 to monitor the activities of users 106. Site 103 and service provider 102 are in communication through global computer network 104. Site 103 is either a host of online interactions between one or more users, or is capable of monitoring other sites that host online interactions between one or more users. For example, site 103 could be a chat site, game site, or an instant messaging service.

Site 103 has access to a database 109 that stores notification criteria and, perhaps, also contact information. If database 109 stores notification criteria only, then site 103 only reports to service provider 102 that the criteria of a particular subscriber has been met. In that case, service provider 102 maintains contact information for that particular subscriber in database 108 and accesses that contact information to send a communication to the subscriber. If database 109 stores both notification criteria and contact information, then site 103 can report to service provider 102 that the criteria of a particular subscriber has been met, as well as provide the contact information necessary to reach the subscriber.

Regardless of whether service provider 102 receives the contact information from site 103 or accesses it from database 108, service provider 102 handles communications to subscriber 110. For this function, service provider 102 includes a communication interface 112. As shown, communications interface 112 is adapted to facilitate communications to a variety of devices of subscriber 110, including, for example, a wireline telephone 116, a wireless telephone 118, a caller identification device 120 (e.g., a caller identification device that uses Advanced TR-30 On-hook signaling or ADSI off-hook signaling), a wireless access protocol (WAP) device 122, a pager 124a, and an interactive two-way pager 124b.

Although FIG. 1 shows a simple communication link 114 between interface 112 and subscriber 110, one of ordinary skill in the art would appreciate that other communication network components are necessary for communication link 114, depending on the device used by subscriber 110. For example, in the case of wireline telephones or caller identification devices, communication link 114 could include a Public Switched Telephone Network (PSTN). For wireless telephones, the communication link could include a PSTN and a cellular network. Optionally, instead of a PSTN, communication link 114 could facilitate voice and video communication over a global computer network, such as VoIP using Transmission Control Protocol/Internet Protocol (TCP/IP).

Figure 2:
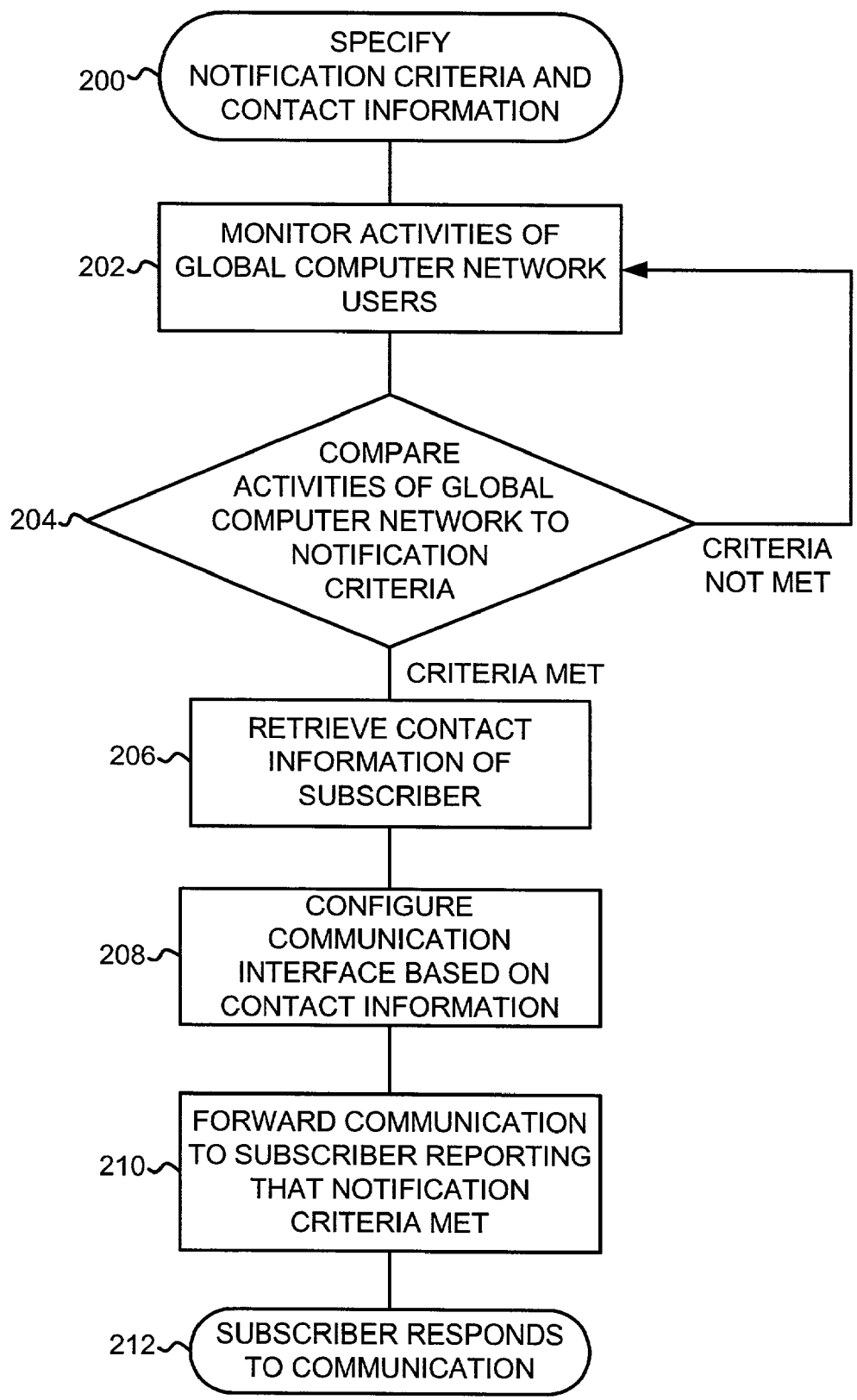
FIG. 2 is a flowchart outlining an exemplary method for notifying an offline global computer network user of online interactions, according to an embodiment of the present invention.

FIG. 2 is a flowchart illustrating the operation of system 100, according to an embodiment of the method of the present invention. As shown, the process begins with step 200, in which subscriber 110 specifies notification criteria and contact information, which can be stored in either or both of databases 108 and 109. The notification criteria establish the conditions under which subscriber 110 wants to be notified. For example, the criteria could dictate that service provider 102 contact subscriber 110 if another particular user logs into a chat room or instant messaging service. As another example, the criteria could specify that service provider 102 contact subscriber 110 if a certain number of users 106 log into a particular chat room. The discussion below addresses the specific implementations provided by different notification criteria.

The contact information specifies the communication means by which service provider 102 is to contact subscriber 110. The contact information could include a single means for contacting subscriber 110, for example, by telephone. The contact information could also include multiple means for contacting subscriber 110 and an order in which to attempt the different means. For example, the contact information could require that service provider 102 try to contact subscriber 110 first by a wireline telephone, then by an interactive two-way pager, and finally by a caller identification device. Service provider 102 would try each method until successfully reaching subscriber 110 or until all methods have been unsuccessfully attempted.

As an alternative embodiment, the contact information could include passcode protection based on the means used to contact subscriber 110. Each contact information entry in database 108 would specify whether subscriber 110 must supply a passcode before receiving the notification, i.e., whether passcode protection is enabled or disabled. Each entry would also specify what the passcode is. This passcode protection is useful for telephone notifications, especially in situations in which a subscriber shares a telephone. Thus, for example, if subscriber 110 shares a wireline telephone and wants to be notified about activity on a Romance Chat Site, requiring the passcode before delivering the notification can prevent others who share subscriber 110's wireline telephone from learning about subscriber 110's personal matters. For situations in which others are unlikely to receive the notification, the passcode protection can be disabled. For example, notification via a wireless telephone would probably not require the passcode protection because subscriber 110 typically has the wireless telephone in his possession and is the only one to use it.

With the notification criteria and contact information established, the method continues in step 202 by monitoring the activities of users 106 occurring on global computer network 104. Service provider 102 can directly monitor the activities occurring on global computer network 104 by hosting those activities (e.g., operating a chat room or instant messaging service). Service provider 102 can also monitor the activities by receiving status updates from operators running those activities, such as site 103.

In step 204, the activities occurring over global computer network 104 are compared to the notification criteria. Thus, service provider 102 or site 103 compares the activities occurring on global computer network 104 to the notification criteria defined in database 108 or database 109, respectively. This comparison can occur periodically or continuously. If the comparison determines that the activities occurring on global computer network 104 do not satisfy the notification criteria, then the process returns to step 202 to continue monitoring global computer network 104.

If, in step 204, the activities occurring on global computer network 104 satisfy the notification criteria, then in step 206 the contact information of subscriber 110 is retrieved. If the contact information is stored in database 109, then site 103 retrieves the contact information and forwards it to service provider 102. If the contact information of subscriber 110 is stored in its own database 108, then service provider 102 retrieves the contact information from database 108.

Based on the contact information, service provider 102 configures communication interface 112 to contact subscriber 110 in step 208. For example, if subscriber 110 has specified that service provider 102 send notification via subscriber 110's mobile interactive two-way pager 124b, then communication interface 112 prepares an e-mail message to send to the address of two-way pager 124b.

In step 210, service provider 102 forwards a communication to subscriber 110 reporting that online activities have satisfied subscriber 110's notification criteria. Thus, for example, if the notification criteria for subscriber 110 dictates that service provider 102 contact subscriber 110 when a particular user of users 106 enters a chat room, and that user does enter the chat room, then service provider 102 sends a message to subscriber 112 stating that the particular user has entered the chat room.

Finally, in step 212, subscriber 110 responds to the notification from service provider 102. This response may simply involve logging onto a computer 126 in communication with global computer network 104, and participating in the activity for which service provider 102 sent the notification. Alternatively, according to specific implementations of the present invention, the response may involve returning a message to service provider 102 to be forwarded to users 106 connected to global computer network 104. These return messages vary, depending on the means by which subscriber 110 was notified.

For example, if service provider 102 places a telephone call to subscriber 110 to report satisfaction of the notification criteria, then communication interface 112 of service provider 102 could provide an interactive voice response unit (IVRU) that accepts a response from subscriber 110. By pressing the number pads on a touch-tone telephone, subscriber 110 could return one of the following exemplary messages: 1) will log in 5 minutes, or 2) cannot log on now. Service provider 102 would then send the response of subscriber 110 through global computer network 104 to users 106, for display on the computers of users 106. In this manner, service provider 102 notifies users 106 as to whether subscriber 110 will be joining them in the online activity.

As another example, if service provider 102 communicates with subscriber 110 using a WAP-enabled device or an interactive two-way pager, then subscriber 110 could return a response using the text entry features of the device. Optionally, the message to subscriber 110 could include means for responding with pre-written, standard responses. In any case, service provider 102 would forward the message from subscriber 110 to users 106.

As another example, if service provider 102 communicates with subscriber 110 using the display of a caller identification device, then subscriber 110 could return a response using off-hook interactive signaling, such as with Analog Display Service Interface (ADSI) devices, as defined by TELCORDIA™. The following publication describes ADSI and is hereby incorporated by reference in its entirety: Telcordia TR-NWT-002173, *Generic Requirements for a SPCS to Customer Premises Equipment (CPE) Data Interface for Analog Display Services*, (ADSI FR-12), 1996.

Through an ADSI display device, service provider 102 can display the notification text to subscriber 110 and can also provide reply softkeys by which subscriber 110 can respond. The reply softkeys correspond to buttons (e.g., six buttons on a device) on the device that subscriber 110 can press to choose options. Thus, for example, on the display screen of the caller ID (ADSI) device, subscriber 100 might see the following notification text message and reply options: "Joe Chef logged into Cooking Chat Room 336 on August 9 at 10:46 a.m. Choose a reply button: [1] Will log on soon; [2] Can not log on; or [3] I want to type a message." Subscriber 110 would then press button 1, 2, or 3 to select the desired option.

If subscriber 110 chooses to return a custom text message (softkey 3), then service provider 102 updates the display of the ADSI device to prompt the user to enter text. To enter text, subscriber 110 can use either the dial pad of the telephone or a separate keyboard, depending upon the capabilities of the particular ADSI device. Service provider 102 also then provides new softkey functions that enable text entry and message deliver, such as "backspace," "next line," "send message," and "cancel." Subscriber 110 presses the corresponding buttons to execute these functions.

Figure 3:
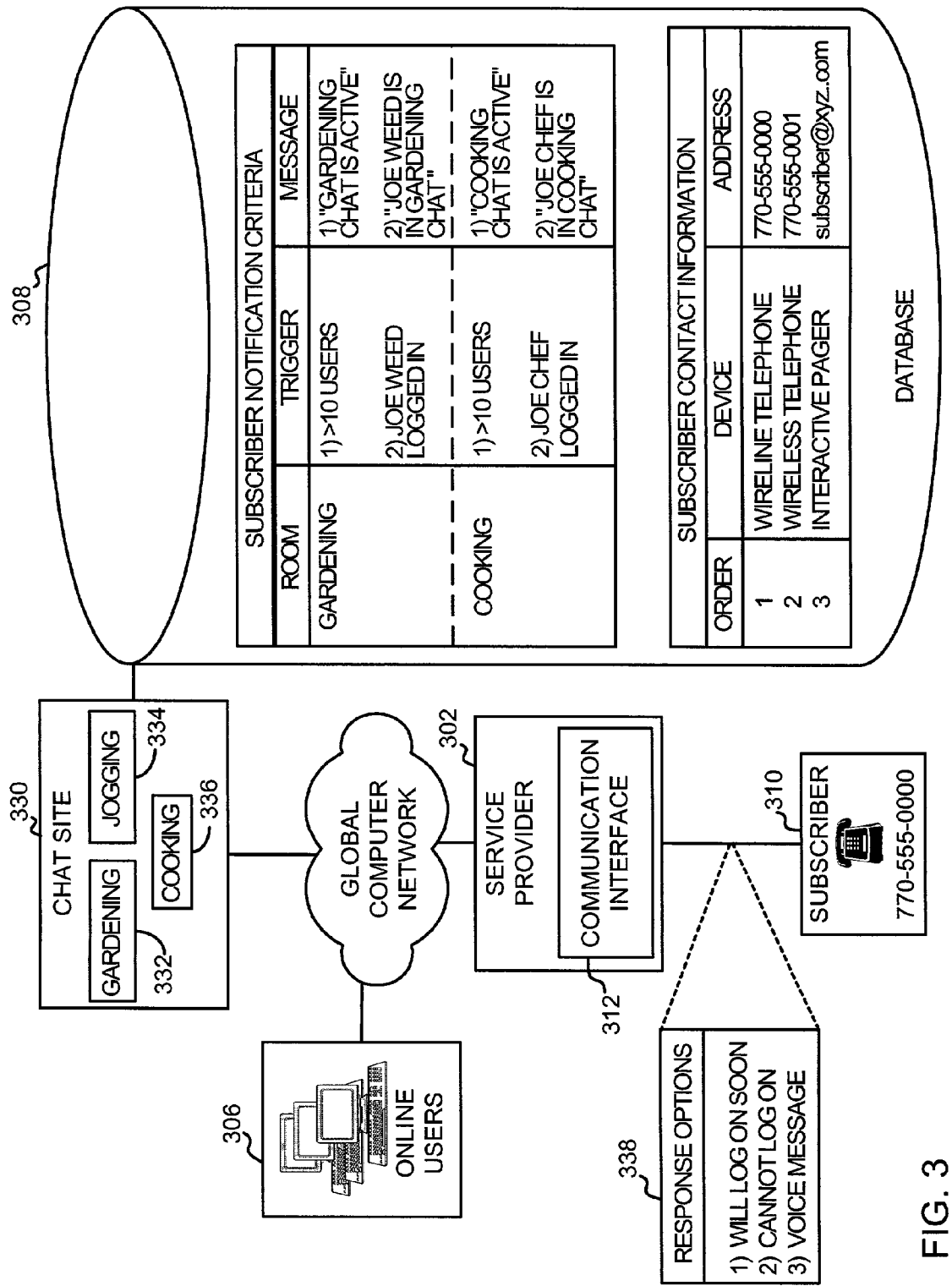
FIG. 3 is a schematic diagram of a system for notifying an offline global computer network user of online interactions related to a chat room, according to an embodiment of the present invention.

FIG. 3 illustrates a specific implementation of the present invention in which a chat site 330 monitors chat rooms against notification criteria set by subscriber 310. If the criteria are satisfied, chat site 330 forwards a message to subscriber 310 through global computer network 304 and service provider 302. The criteria in this example include: 1) the number of users logged into a particular chat room exceeds a preset amount, and 2) a particular user logs into the chat room. Although this specific implementation is described in terms of chat rooms, the criteria and processes apply to any global computer network site (e.g., web site) that facilitates real-time online interactions between two or more users. Game sites are another example of these types of sites.

As shown in FIG. 3, in this example, chat site 330 hosts chat rooms devoted to gardening 332, jogging 334, and cooking 336. Chat site 330 is in communication with a database 308 that stores the notification criteria specified by subscriber 310. The notification criteria specify activities about which subscriber 310 would like to be notified, including the name of a chat room, the activities related to the chat room that trigger notification, and the messages that are sent to subscriber 310 to describe the occurrence of the various activities. Database 308 also stores contact information for subscriber 310, which includes the devices by which to reach subscriber 310, the addresses or telephone numbers of those devices, and the order in which to try the devices.

In this example, subscriber 310 is interested in gardening chat room 332 and cooking chat room 336. For both chat rooms, subscriber 310 has requested notification if more than 10 users log in, presumably indicating a lively and worthwhile discussion. The message to be delivered to subscriber 110 in these instances describes the chat room as active.

Subscriber 310 is also interested in communicating with or simply observing to particular users, who perhaps may have special expertise in the chat room topic or may just be entertaining in some way. Thus, for gardening chat room 332, subscriber 310 has requested notification if the user, "Joe Weed," logs in. Similarly, for cooking chat room 336, subscriber 310 has requested notification if the user, "Joe Chef," logs in. The message to be delivered to subscriber 110 in these instances states that the particular user has entered the chat room.

With the notification criteria defined, chat site 330 monitors chat rooms 332 and 336 as online users 306 enter and exit the rooms. Whenever a trigger from the notification criteria is met, chat site 330 notifies service provider 302 of the event. In notifying service provider 302, chat site 330 provides an identification of subscriber 310 (e.g., a user name), a message to give subscriber 310, and the method by which to reach subscriber 310. Chat site 330 determines the subscriber identification and message from the notification criteria of database 308. Chat site 330 determines the method by which to reach subscriber 310 from the contact information stored in database 308.

Thus, in this example, if Joe Chef logs into cooking chat room 336, chat site 330 provides service provider 302 with the user name of subscriber 310, the message "Joe Chef is in cooking chat room," and the telephone number (770-555-0000) of subscriber 310's wireline telephone. Chat site 330 can also pass along the alternate methods of reaching subscriber 310 (i.e., by wireless telephone and interactive pager) in case a call to subscriber 310's wireline telephone is unsuccessful.

After service provider 302 receives notification of the triggering event from chat site 330, service provider 302 uses interface 312 to prepare a communication to subscriber 310. The content of this communication is the message that was retrieved from the notification criteria of database 308. Communication interface 312 configures the message in a format compatible with the device of subscriber 310 with which service provider 302 is communicating.

Continuing this example, service provider 302 delivers the message, "Joe Chef is in cooking chat room," to the wireline telephone of subscriber 310. Communication interface 312 therefore converts the text retrieved from database 308 into speech. Once converted, communication interface 312 places a telephone call to the wireline telephone of subscriber 310 and plays the audio message.

In addition to delivering the audio message, this embodiment provides subscriber 310 with options for responding to the message. Accordingly, communication interface 312 provides an interactive voice response unit with which subscriber 310 can interact using a touch-tone telephone. These responses would be appropriate in situations in which subscriber 310 has a relationship with Joe Chef, as opposed to being strangers to one another. In this manner, Joe Chef would be interested in knowing whether his friend, subscriber 310, will be joining him online.

Thus, in this example, after playing the audio message, communication interface 312 offers three options 338 for responding: 1) will log on soon; 2) cannot log on; or 3) leave a voice message. If subscriber 310 chooses options 1 or 2, service provider 302 delivers the corresponding message to Joe Chef via global computer network 304. So as not to confuse Joe Chef, in addition to reporting the intentions of subscriber 310, the message can also explain that subscriber 310 has a notification service that notifies subscriber 310 whenever his buddies log on to global computer network 304 or enter a particular chat room. Joe Chef would understand that his entering cooking chat room 336 sent a notification to subscriber 310 to which subscriber 310 responded.

If subscriber 310 chooses option 3, then service provider 302 records a voice message from subscriber 310 and delivers the message to Joe Chef. The message is, again, prefaced with an explanation of why Joe Chef is receiving the message. The message can be delivered as a voice or text communication. For voice communication, the hardware of service provider 302 and Joe Chef is compatible with voice protocols over global computer network 304 (e.g., VoIP). For text communication, service provider 302 has speech-to-text capabilities.

The reply message from subscriber 310, whether from option 1, 2, or 3, can be delivered in any number of ways. For example, service provider 302 could broadcast subscriber 310's reply in cooking chat room 336 or somewhere else on chat site 330. This delivery method would enable other chat users to see subscriber 310's reply. As a more private option, service provider 302 could send a text message to Joe Chef using an instant messaging service. Joe Chef would, of course, have to have his instant messaging service activated to receive subscriber 310's reply message. As another option, if Joe Chef subscribes to service provider 302's notification service, then service provider 302 could send Joe Chef a notification as described herein, in accordance with the method by which Joe Chef elected to receive notifications.

In the above embodiment of FIG. 3, a triggering event specified in database 308 initiates the notification to subscriber 310. In an alternate embodiment of the present invention, the users 306 logged into a chat room initiate the notification. Specifically, users 306 forward a message to subscriber 310 requesting that subscriber 310 log into a particular chat room. Users 306 can create this message through global computer network 304 using cooperative software provisioned at users 306 and chat site 330 or service provider 302. Service provider 302 delivers the message to subscriber 310 and returns a response from subscriber 310 to users 306, as described above for the triggering-event embodiment. The response tells users 306 whether subscriber 310 will accept their invitation and join them online in the particular chat room.

In this alternate embodiment, users 306 do not have to subscribe to service provider 302 to initiate the notification. Instead, users 306 trigger notifications using the notification service of existing subscribers. Accordingly, database 308 contains a list of subscribers to the notification service. Database 308 marks each subscriber in the list to indicate whether the subscriber authorizes chat site 330 to list the user's name on chat site 330 and to allow any user to notify the subscriber and ask the subscriber to log into a chat room. Chat site 330 accesses database 308, retrieves the subscribers that are marked as receptive to notifications from any user, and lists those subscribers on chat site 300. Users 306 can then peruse the list of subscribers and select any or all of the subscribers in the list to send notifications requesting that the subscribers join the online chat room interaction. In selecting subscribers to notify, software provisioned at users 306, chat site 330, or service provider 302 could restrict users 306 to sending pre-written messages, or, optionally, could allow users 306 to send customized messages.

In another alternate embodiment of the present invention, instead of specifying as a triggering event the entry of a single user into a chat room, subscriber 310 could designate a triggering event to be the entry of any one of a group of users into a chat room. For example, subscriber 310 may have a buddy list containing users with which he regularly exchanges messages through an instant messaging service. In this case, subscriber 310 could request notification from service provider 302 if any one of those buddies enters a particular chat room. The message retrieved from database 308 would tell subscriber 310 which of the buddies had entered the chat room. Service provider 302 would send the notification each time that a buddy enters the particular chat room.

Figure 4:
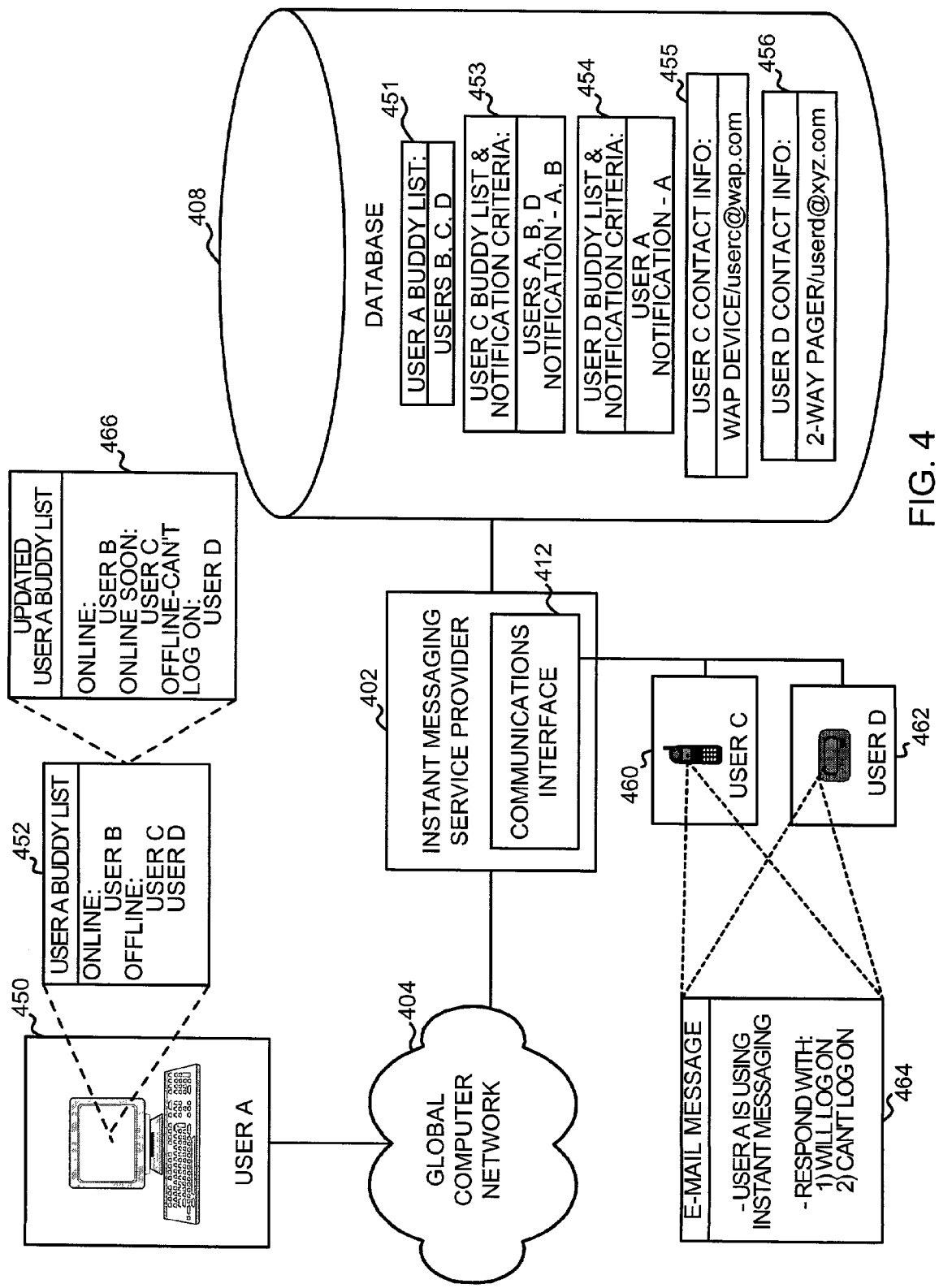
FIG. 4 is a schematic diagram of a system for notifying an offline global computer network user of online interactions related to an instant messaging service, according to an embodiment of the present invention.

FIG. 4 illustrates a specific implementation of the present invention in which an instant messaging service provider 402 notifies offline subscribers when a buddy from the offline subscribers' buddy lists logs onto the instant messaging service. Specifically, users C and D want to be notified when user A, who is listed on both buddy lists of users C and D, logs into the instant messaging service. In this manner, service provider 402 can alert offline subscribers to online interactions in which they can participate. The notification that this implementation provides adds significant value to an instant messaging service by increasing the possibility that buddies will connect with each other online.

In this implementation, user A logs onto the instant messaging service through a computer 450 in communication with service provider 402 through global computer network 404. As part of the instant messaging service, service provider 402 retrieves from database 408 user A's buddy list 451, which in this case contains users B, C, and D. Service provider 402 also determines the online/offline status of each of the users on the buddy list. In this context, online and offline refer to whether or not a user is logged into the instant messaging service.

Service provider 402 then sends the buddy list and online/offline statuses to computer 450 of user A. Computer 450 displays buddy list 451 in a window 452, indicating which users are online and which are offline. In this example, user B is online and ready to exchange instant messages. Users C and D are offline.

At the same time service provider 402 is sending buddy list 451 to user A, service provider 402 also consults database 408 to determine which users have requested to be notified when user A logs onto the instant messaging service. Service provider 402 therefore checks the notification criteria for every subscriber, looking for a listing of user A. As shown, the user C buddy list and notification criteria 453 and the user D buddy list and notification criteria 454 both list user A.

In accordance with notification criteria 453 and 454, service provider 402 prepares a message to be sent to users C and D. The message reports that user A has logged onto the instant messaging service. Service provider 402 also retrieves the contact information 455 for user C and the contact information 456 for user D. In this example, user D has requested to be notified through a WAP device 460 at the address, "userc@wap.com." User C has requested to be notified through an interactive two-way pager 462 at the address, userd@xyz.com.

Optionally, while service provider 402 is preparing to send messages to offline users C and D, service provider 402 also sends a message to user A indicating that the buddies of user A are being notified that user A has just logged on.

Service provider 402 configures communication interface 412 in accordance with the device to which it is sending the message. In this case, interface 412 prepares an e-mail message 464 to send to the addresses of users C and D (i.e., userc@wap.com and userd@xyz.com, respectively). As an example, e-mail message 464 could include text such as, "User A is using instant messaging."

Similar to the response options provided by the IVRU in the example of FIG. 3, the e-mail message in this example could include options for responding to the notification. For instance, e-mail message 464 includes two automatic responses: 1) will log on, and 2) cannot log on. Thus, after learning that user A has logged into the instant messaging service and is available to exchange messages, offline users C and D can decide if they want to join user A and can inform user A of their intentions. In this example, user C decides to join user A online and chooses option 1. User D is unable to go online and therefore chooses option 2.

Service provider 402 receives the responses of users C and D and forwards them through global computer network 404 to the computer 450 of user A. Service provider 402 displays the responses by updating user A's instant messaging buddy list, as shown in window 466. In accordance with their responses, user C's status indicates that user C will be online soon and user D's status indicates that user D is offline and cannot log on.

Optionally, in addition to the "canned" responses represented by options 1 and 2, service provider 402 allows users C and D to respond to e-mail message 464 with customized messages. In this manner, service provider 402 can pass a message to user A to handle situations not covered by the canned responses. For example, user D may have a pressing need to exchange messages with user A, but may not be able to immediately log on. Thus, user D could forward the following customized message to user A: "I have an important issue to discuss with you, but I can't log on right now. Meet me online tonight at 8:00 PM." Service provider 402 would display this message on the computer 450 of user A, for example, in a section of window 466, separate from user A's buddy list. The displayed message would indicate who the sender is (i.e., user D).

As another option, service provider 402 supports an exchange between offline users and online users. In this way, user A can respond to a customized message from an offline user. Thus, continuing the example immediately above, user A could respond to user D with the message, "Can't meet at 8:00 PM—how about 9:00 PM?" Service provider 402 would receive this message through global computer network 404 and would forward it to user D using communication interface 412, in the same way that e-mail message 464 was originally forwarded. User D could then respond with another customized message that ends the exchange: "Meeting at 9:00 PM is fine."

Although this exemplary exchange is with an interactive pager 462, communication interface 412 could support these exchanges for offline users using other devices, such as wireline and wireless telephones. Of course, with these other devices, communication interface 412 would use well-known technologies to translate between online communication and whatever form of communication the offline user is using. For example, if the offline user provides an audio customized message over a wireline telephone, communication interface 412 could include a speech-to-text converter that enables service provider 402 to deliver a text message to the online user. Or, as another example, communication interface 412 could record the offline user's audio message in a digital audio file (e.g., WAVE file format or MP3 format), which service provider 402 would deliver to the online user for playing on the online user's computer.

Figure 5:
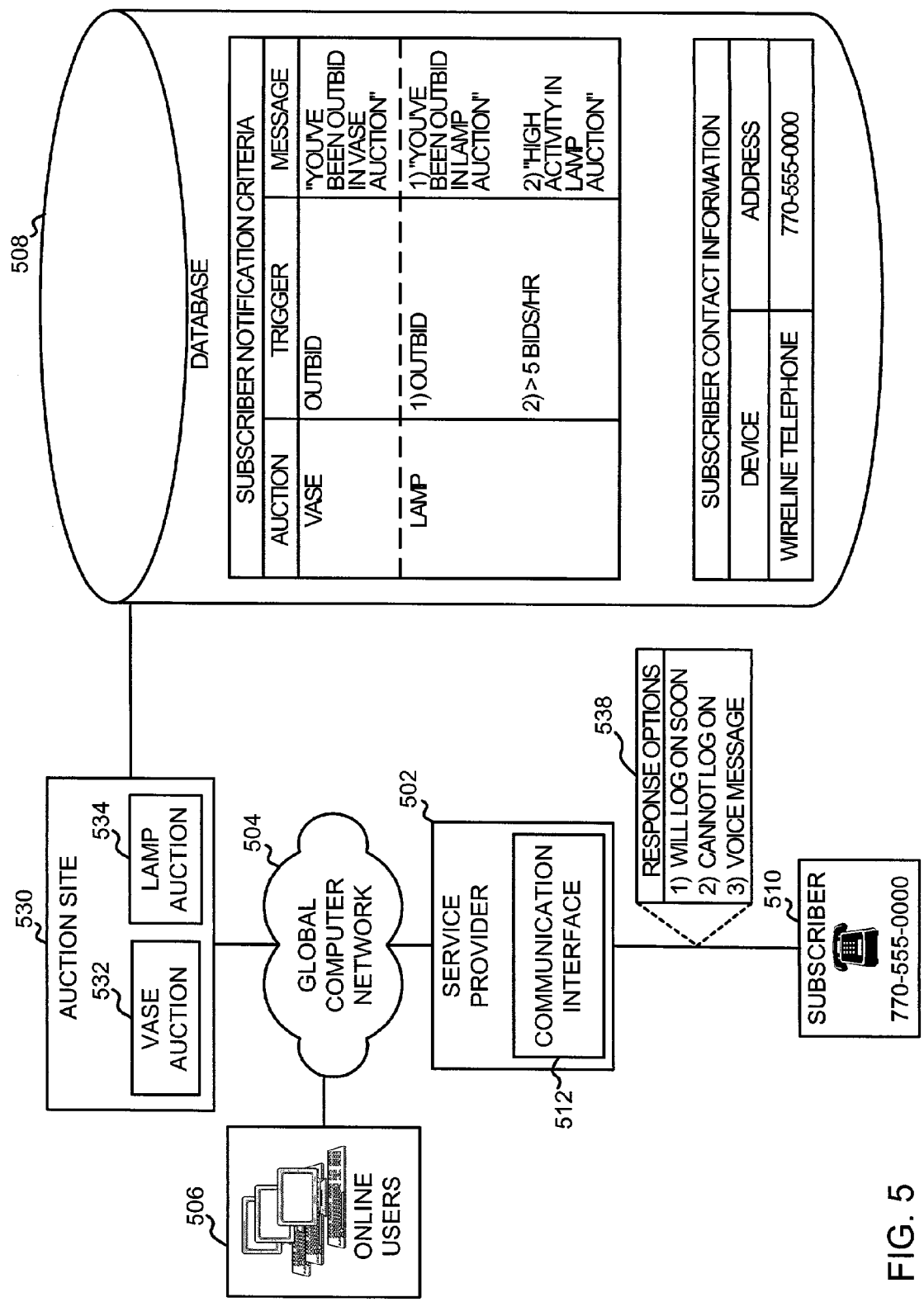
FIG. 5 is a schematic diagram of a system for notifying an offline global computer network user of online interactions related to an auction site, according to an embodiment of the present invention.

FIG. 5 illustrates a specific implementation of the present invention in which an auction site 530 monitors auctions against notification criteria set by subscriber 510. If the criteria are satisfied, auction site 530 forwards a message to subscriber 510 through global computer network 504 and service provider 502. The criteria in this example include: 1) entry of a bid that exceeds the subscriber's currently high bid, and 2) the number of bids submitted within a certain duration exceeds a preset amount. Thus, in this example, service provider 502 notifies subscriber 510 when the subscriber has been outbid in an interactive online auction or when activity increases in an interactive online auction.

As shown in FIG. 5, in this example, auction site 530 is hosting a vase auction 532 and a lamp auction 534. Auction site 530 is in communication with a database 508 that stores the notification criteria specified by subscriber 510, related to the auctions 532 and 534. The notification criteria specify activities about which subscriber 510 would like to be notified, including the name of the particular auction, the activities related to the auction that trigger notification, and the messages that are sent to subscriber 510 to describe the occurrence of the various activities. Database 508 also stores contact information for subscriber 510, which specifies how to reach subscriber 510.

In this example, subscriber 510 wants to participate in vase auction 532 and lamp auction 534. For both auctions, subscriber 510 has requested notification if another user of users 506 outbids a high bid of the subscriber 510. In these instances, the message to be delivered to subscriber 510 identifies the pertinent auction and informs subscriber 510 of the new high bid. The message could also indicate the amount of the new high bid.

Subscriber 510 is also interested in observing or participating in auctions that are receiving many bids. Subscriber 510 may want to monitor the auction to formulate strategies about submitting bids closer to the bid deadline. Or, subscriber 510 may be selling the item in the auction, and wish to be notified when his auction is generating much activity. In any case, for lamp auction 534, subscriber 510 has requested notification if more than five bids are submitted in an hour. The message to be delivered to subscriber 110 in this instance states that the particular auction is active.

With the notification criteria defined, auction site 530 monitors auctions 532 and 534 as online users 506 submit bids. Whenever a trigger from the notification criteria is met, auction site 530 notifies service provider 502 of the event. In notifying service provider 502, auction site 530 provides an identification of subscriber 510 (e.g., a user name), a message to give subscriber 510, and the method by which to reach subscriber 510. Auction site 530 determines the subscriber identification and message from the notification criteria of database 508. Auction site 530 determines the method by which to reach subscriber 510 from the contact information stored in database 508.

Thus, in this example, if subscriber 510's high bid in vase auction 532 is beat by another bid from users 506, then auction site 530 provides service provider 502 with the user name of subscriber 510, the message "You've been outbid in vase auction," and the telephone number (770-555-0000) of subscriber 510's wireline telephone. After service provider 502 receives notification of the triggering event from auction site 530, service provider 502 uses interface 512 to prepare a communication to subscriber 510. The content of this communication is the message that was retrieved from the notification criteria of database 508. Communication interface 512 configures the message in a format compatible with the device of subscriber 510, i.e., a wireline telephone. This configuration therefore involves converting the text ("You've been outbid in vase auction") retrieved from database 508 into speech. Once converted, communication interface 512 places a telephone call to the wireline telephone of subscriber 510 and plays the audio message.

In addition to delivering the audio message, this embodiment provides subscriber 510 with options for responding to the message. Accordingly, communication interface 512 provides an interactive voice response unit with which subscriber 510 can interact using a touch-tone telephone. These responses inform the new high bidder of the intentions of the previous high bidder (i.e., subscriber 510). In this manner, the new high bidder can find out almost immediately whether the previous high bidder will respond with another new high bid.

To educate the new high bidder about this service feature, this embodiment delivers a message through auction site 530 to the new high bidder shortly after the new high bidder submits the new high bid. As an example, service provider 502 could display the following message: "The high bidder that you have just outbid subscribes to a service that provides instantaneous offline notification of your new high bid. Please stand by online for a few minutes to see if the displaced high bidder will respond to your new high bid. With both of you online, the interactive online auction process will be more entertaining and efficient. Thank you."

As another option, instead of having the new higher bidder stand by to see if subscriber 510 responds to the new high bid, service provider 502 could solicit the new high bidder to subscribe to the notification service. By registering for the service, the new higher bidder could go offline and accomplish other tasks without waiting to see if he is outbid. In subscribing to the notification service, service provider 502 would automatically notify the new high bidder when he is outbid.

As an example, service provider 502 could display on auction site 530 the following message to the new high bidder (who is not a subscriber): "Now that you are the high bidder, would you like us to monitor the auction and automatically notify you by telephone, pager, or other means, if you are outbid?" If the new high bidder chooses to sign up, then service provider 502 presents a registration screen that collects the information (e.g., notification criteria and contact information) that is stored in database 508. The new high bidder is then a subscriber to the notification service.

After playing the audio message to subscriber 510 notifying subscriber 510 that he has been outbid, communication interface 512 offers three options 538 for responding: 1) will log on; 2) cannot log on; or 3) submit a new high bid. Assuming that the new higher bidder chooses to stand by (rather than subscribing to the notification service), if subscriber 510 chooses options 1 or 2, service provider 502 delivers the corresponding message to the new high bidder (who is one of users 506) via global computer network 504. Thus, the new high bidder knows whether or not to wait for subscriber 510 to log on.

If subscriber 510 chooses option 3, then the interactive voice response unit of service provider 502 asks subscriber 510 to enter a new high bid amount using the touch-tone key pads of the wireline telephone. Service provider 502 then indicates that subscriber 510 is, once again, the high bidder. Having remained online pending subscriber 510's response, the previous high bidder (of users 506) receives notification that subscriber 510 is again the high bidder. Service provider 502 provides this notification either by updating auction site 530 with the identification of the new high bidder or by sending a message directly to the previous high bidder (of users 506) through global computer network 504. Of course, the process will continue if the previous high bidder then submits a new high bid exceeding subscriber 510's second bid.

Figure 6:
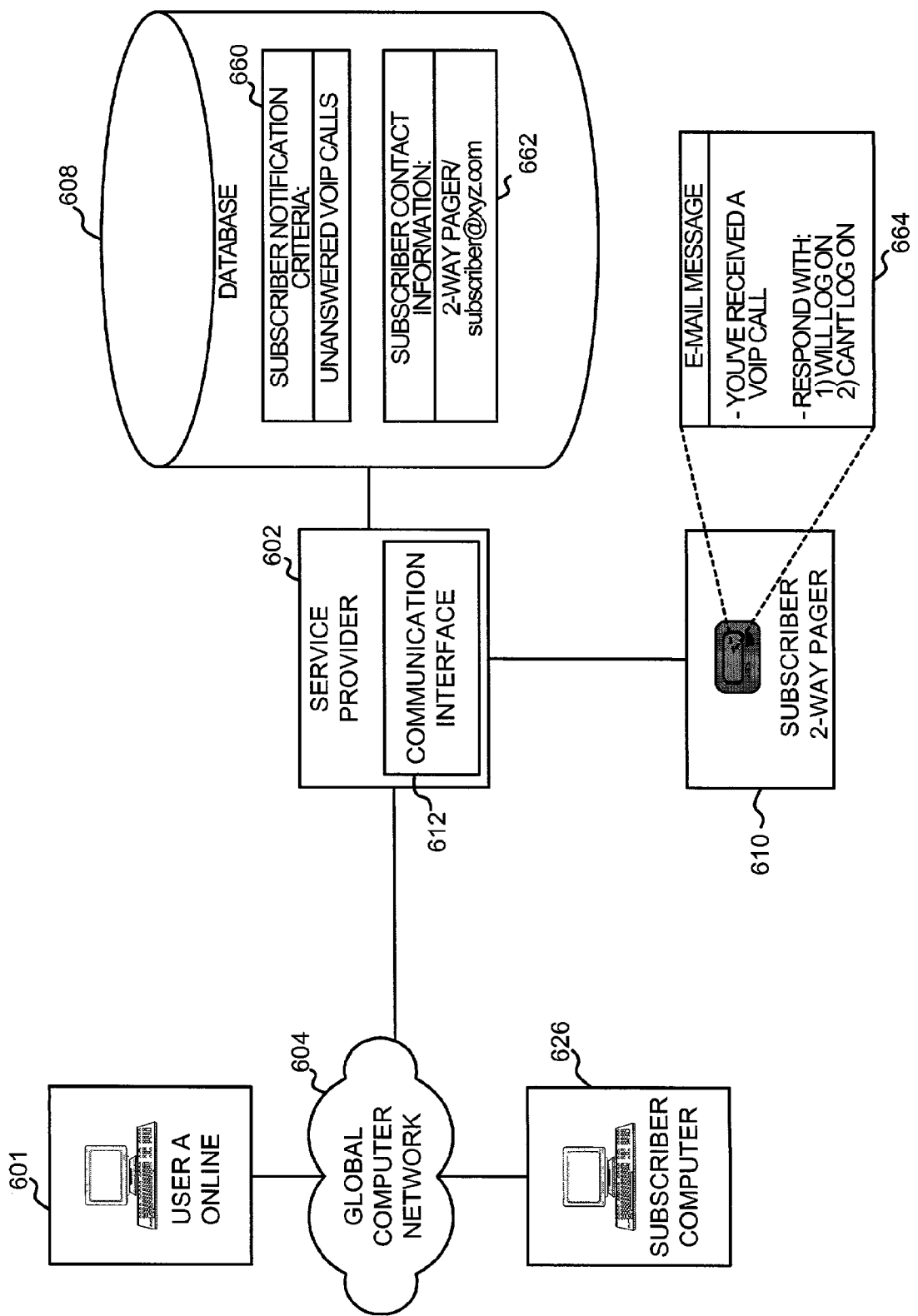
FIG. 6 is a schematic diagram of a system for notifying an offline global computer network user of online interactions related to calls made over a global computer network, according to an embodiment of the present invention.

FIG. 6 illustrates a specific implementation of the present invention in which a service provider notifies an offline subscriber when the subscriber has received an unanswered PC-to-PC call to the network address of the subscriber's computer. Service provider 602 is in communication with database 608, which contains notification criteria 660 and contact information 662 for the subscriber. In this example, notification criteria 660 specifies that the subscriber will be notified about unanswered VoIP calls. Contact information 662 indicates that the subscriber is to be notified via an interactive pager having the address subscriber@xyz.com.

In accordance with notification criteria 660, service provider 602 monitors global computer network 604 for VoIP calls to the network address of subscriber computer 626. If computer 626 does not answer a VoIP call from user A, service provider 602 prepares a message to be sent to the subscriber. The message reports that user A has attempted a VoIP PC to PC call to the subscriber. Service provider 602 also retrieves the subscriber contact information 662.

Optionally, while service provider 602 is preparing to send a message to the offline subscriber, service provider 602 also sends a message to user A indicating that service provider 602 is contacting the called party (subscriber 610) to see if the called party will log on to accept the VoIP call.

Service provider 602 configures communication interface 612 in accordance with the device to which it is sending the message. In this case, interface 612 prepares an e-mail message 664 to send to the address of the subscriber's interactive pager 610 (i.e., subscriber@xyz.com). As an example, e-mail message 664 could include the text, "You've received a VoIP call." The text could also identify the calling party.

E-mail message 664 also includes options for responding to the notification. For instance, e-mail message 664 includes two automatic responses: 1) will log on, and 2) cannot log on. Thus, after learning that user A wants to conduct a VoIP call, the offline subscriber chooses an option to indicate whether he plans to log on and accept the call. Service provider 602 receives the subscriber's choice and forwards a corresponding message through global computer network 604 for display on the computer 601 of user A. In this manner, user A knows whether to wait online for the subscriber to log in and accept the call.

Optionally, in addition to the "canned" responses represented by options 1 and 2, service provider 602 may allow the subscriber to respond to e-mail message 664 with customized messages. With this feature, service provider 602 can pass a message to user A to handle situations not covered by the canned responses. For example, the subscriber may want to take the call at a later time. Along these lines, subscriber 610 could forward the following customized message to user A: "Can't talk now. Call me back at 5:00 PM when I'll be online." Service provider 602 would display this message on the computer 601 of user A.

As another option, service provider 602 supports an exchange between offline users and online users. In this way, user A can respond to a customized message from the offline subscriber. Thus, continuing the example immediately above, user A could respond to subscriber 610 with the message, "Sounds good—talk to you then." Service provider 602 would receive this message through global computer network 604 and would forward it to the subscriber's interactive pager 610 using communication interface 612, in the same way that e-mail message 664 was originally forwarded.

Thus, in effect, the present invention facilitates instant messaging between offline subscribers and online users (non-subscribers). By converting offline subscriber responses (e.g., text, touch-tone selection, or caller identification device softkey selection) to an instant message and presenting that converted message, the present invention serves as a conduit for offline/online instant messaging.

Although this specification describes the present invention in the context of chat rooms, game sites, instant messaging services, auction sites, and calls over a global computer network, one of ordinary skill in the art would appreciate that the present invention is equally applicable to other online interactions as well. For this reason, and notwithstanding the particular benefits associated with using the present invention for the described online interactions, the system and method described herein should be considered broadly useful for any situation in which an offline user desires notification of online interactions.

In describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, unless that order is explicitly described as required by the description of the process in the specification. Otherwise, one skilled in the art can readily appreciate that the sequences may be varied and still remain within the spirit and scope of the present invention.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method of notification, comprising:
   monitoring a total number of users who log in to a website;
   comparing the total number of users to notification criteria of an offline user, the notification criteria specifying a preset amount of users that log in to the website;
   when the total number of users exceeds the preset amount, then sending a caller identification message to the offline user;
   receiving a response to the caller identification message using off-hook signaling;
   receiving a monitoring notification from an operator of the website, the monitoring notification informing of a particular user that has logged into the website, the monitoring notification identifying contact information for buddies in a buddy list who wish to be informed of the particular user's entry into the website, the monitoring notification comprising text to be delivered to the buddies in the buddy list;
   converting the text in the monitoring notification to an audible message;
   delivering the audible message to a telephone number of a buddy in the buddy list;
   receiving the buddy's response to the audible message via an interface to an interactive voice response unit;

prefacing the response with an explanation of why the buddies will receive the buddy's response; and broadcasting the buddy's response to the buddies in the buddy list, wherein the notification informs the buddy of activity in the website.

2. The method of claim 1, wherein the website is a chat room and the notification criteria further comprise a topic of discussion.

3. The method of claim 1, wherein the website is a game site and the notification criteria further comprise when a high score has been exceeded.

4. The method of claim 1, wherein the website is an auction site and the notification criteria comprise entry of a bid that exceeds a high bid submitted by the offline user.

5. The method of claim 1, wherein the website is an auction site and the notification criteria comprise a number of bids submitted within a certain duration.

6. The method of claim 1, further comprising reporting the caller identification message to another offline user.

7. The method of claim 1, further comprising sending an offline communication to the offline user in accordance with the offline user's contact information.

8. The method of claim 7, wherein the contact information comprises a communication device type and an address of the communication device.

9. The method of claim 7, wherein the contact information comprises a plurality of communication device types of the offline user, addresses for each of the plurality of communication device types, and an order in which to attempt the plurality of communication device types.

10. The method of claim 7, wherein sending the offline communication comprises sending the offline communication to one of a wireline telephone, a wireless telephone, a caller identification device, a wireless access protocol device, a one-way pager, and an interactive pager.

11. The method of claim 1, wherein receiving the buddy's response comprises receiving audio inputs and converting the audio inputs to text for transmission through the global computer network.

12. The method of claim 1, wherein receiving the buddy's response comprises receiving audio inputs, recording the audio inputs as digital audio files, and transmitting the digital audio files through the global computer network to the buddies in the buddy list.

13. The method of claim 7, wherein sending the offline communication comprises sending the offline communication to one of an interactive pager and a wireless access protocol device, and wherein receiving the buddy's response comprises receiving an input from the interactive pager or the wireless access protocol device.

14. The method of claim 13, wherein the input comprises one of a standard message and a customized message.

15. The method of claim 1, wherein the buddy's response comprises the notification criteria and a time and a date that the notification criteria were satisfied.

16. The method of claim 7, further comprising requiring the offline user to provide a passcode before the offline communication.

17. A computer providing notification of an online interaction occurring on a global computer network, the computer performing:

monitoring a total number of users who log in to a website;

when a user logs in, comparing the total number of users to notification criteria of an offline user, the notification criteria specifying a preset amount of users that log in to the website; and when the total number of users exceeds the preset amount, then sending a caller identification message to the offline user;

receiving a response to the caller identification message using off-hook signaling;

receiving a monitoring notification from an operator of the website, the monitoring notification informing of a particular user that has logged into the website, the monitoring notification identifying contact information for buddies in a buddy list who wish to be informed of the particular user's entry into the website, the monitoring notification comprising text to be delivered to the buddies in the buddy list;

converting the text in the monitoring notification to an audible message;

delivering the audible message to a telephone number of a buddy in the buddy list;

receiving the buddy's response to the audible message via an interface to an interactive voice response unit;

prefacing the response with an explanation of why the buddies will receive the buddy's response; and broadcasting the buddy's response to the buddies in the buddy list, wherein the notification informs the offline user of an amount of activity in the website.

18. The computer of claim 17, wherein the website is a chat room and the notification criteria further comprise a topic of discussion.

19. The computer of claim 17, wherein the website is a game site and the notification criteria further comprise when a high score has been exceeded.

20. The computer of claim 17, wherein the website is an auction site and the notification criteria comprise entry of a bid that exceeds a high bid submitted by the offline user.

21. The computer of claim 17, wherein the computer further performs sending an offline communication to the offline user in accordance with the offline user's contact information.

22. The computer of claim 21, wherein the contact information comprises a communication device type and an address of the communication device.

23. The computer of claim 21, wherein the contact information comprises a plurality of communication device types of the offline user, addresses for each of the plurality of communication device types, and an order in which to attempt the plurality of communication device types.

24. The computer of claim 21, wherein sending the offline communication comprises sending the offline communication to one of a wireline telephone, a wireless telephone, a caller identification device, a wireless access protocol device, a one-way pager, and an interactive pager.

25. A system providing notification of an online interaction occurring on a global computer network, the system storing instructions for performing a method, the method comprising:

monitoring a total number of users who log in to a website;

comparing the total number of users to notification criteria of an offline user, the notification criteria specifying a preset amount of users that log in to the website;

when the total number of users exceeds the preset amount, then sending a caller identification message to the offline user;

receiving a response to the caller identification message using off-hook signaling;
receiving a monitoring notification from an operator of the website, the monitoring notification informing of a particular user that has logged into the website, the monitoring notification identifying contact information for buddies in a buddy list who wish to be informed of the particular user's entry into the website, the monitoring notification comprising text to be delivered to the buddies in the buddy list;
converting the text in the monitoring notification to an audible message;
delivering the audible message to a telephone number of a buddy in the buddy list;
receiving the buddy's response to the audible message via an interface to an interactive voice response unit;
prefacing the response with an explanation of why the buddies will receive the buddy's response; and
broadcasting the buddy's response to the buddies in the buddy list.

26. The system of claim 25, wherein the website is a chat room and the notification criteria further comprise a topic of discussion.

27. The system of claim 25, wherein the website is a game site and the notification criteria further comprise when a high score has been exceeded.

28. The system of claim 25, wherein the website is an auction site and the notification criteria comprise entry of a bid that exceeds a high bid submitted by the offline user.

29. The system of claim 25, further comprising instructions for sending an offline communication to the offline user in accordance with the offline user's contact information.

30. The system of claim 29, wherein the contact information comprises a communication device type and an address of the communication device.

31. The system of claim 29, wherein the contact information comprises a plurality of communication device types of the offline user, addresses for each of the plurality of communication device types, and an order in which to attempt the plurality of communication device types.

32. The system of claim 29, further comprising instructions for sending the offline communication to one of a wireline telephone, a wireless telephone, a caller identification device, a wireless access protocol device, a one-way pager, and an interactive pager.

33. A system for notifying an offline user of an online interaction, the system comprising:
(a) means for retrieving notification criteria of the offline user, the notification criteria specifying a preset amount of users that log in to a website;
(b) means for monitoring a total number of users who log in to the website;
(c) means for comparing the total number of logged in users to the notification criteria;
(d) when the total number of users exceeds the preset amount, then means for sending a caller identification message to the offline user;
(e) means for receiving a response to the caller identification message using off-hook signaling;
(f) means for receiving a monitoring notification from an operator of the website, the monitoring notification informing of a particular user that has jogged into the website, the monitoring notification identifying contact information for buddies in a buddy list who wish to be informed of the particular user's entry into the website, the monitoring notification comprising text to be delivered to the buddies in the buddy list;
(g) means for converting the text in the monitoring notification to an audible message;
(h) means for delivering the audible message to a telephone number of a buddy in the buddy list;
(i) means for receiving the buddy's response to the audible message via an interface to an interactive voice response unit;
(j) means for prefacing the response with an explanation of why the buddies will receive the buddy's response; and
(k) means for broadcasting the buddy's response to the buddies in the buddy list.

34. The system of claim 33, wherein the website is one of a chat room, a game site, and an auction.

35. A method for notifying an offline user of an interaction in which the offline user could participate, wherein the interaction occurs on an instant messaging service, the method comprising:
monitoring a total number of users that log into the instant messaging service;
when the total number of logged in users exceeds a predefined amount, then sending a caller identification message to the offline user;
receiving a response to the caller identification message using off-hook signaling;
receiving a monitoring notification from an operator of the instant messaging service, the monitoring notification informing of a particular user that has logged into the instant messaging service, the monitoring notification identifying contact information for buddies in a buddy list who wish to be informed of the particular user's entry into the instant messaging service, the monitoring notification comprising text to be delivered to the buddies in the buddy list;
converting the text in the monitoring notification to an audible message;
delivering the audible message to a telephone number of a buddy in the buddy list;
receiving the buddy's response to the audible message via an interface to an interactive voice response unit;
prefacing the response with an explanation of why the buddies will receive the buddy's response; and
broadcasting the buddy's response to the buddies in the buddy list.

36. A method for notifying an offline user of activities occurring on an auction website, the method comprising:
retrieving notification criteria under which to notify the offline user, the notification criteria specifying a preset amount of users that log in to the auction website;
monitoring a total number of users who log in to the auction website;
comparing the total number of logged in users to the preset amount;
when the total number of logged in users exceeds a predefined amount, then sending a caller identification message to the offline user;
receiving a response to the caller identification message using off-hook signaling;
receiving a monitoring notification from an operator of the auction website, the monitoring notification informing of a particular user that has logged into the auction website, the monitoring notification identifying contact information for buddies in a buddy list who wish to be informed of the particular user's entry into the auction website, the monitoring notification comprising text to be delivered to the buddies in the buddy list;

converting the text in the monitoring notification to an audible message;

delivering the audible message to a telephone number of a buddy in the buddy list;

receiving the buddy's response to the audible message via an interface to an interactive voice response unit;

prefacing the response with an explanation of why the buddies will receive the buddy's response; and broadcasting the buddy's response to the buddies in the buddy list.

37. The method of claim 36, wherein the notification criteria comprises at least one of:

when a bid is entered that exceeds a high bid of the offline user, and when the number of bids entered within a duration exceeds a preset amount.

38. The method of claim 36, further comprising reporting a high bid from the offline user to users logged into the auction website.

* * * * *